7237X
W. Bryant,
Windlass Water Elevator.
Patented Oct. 25, 1832.
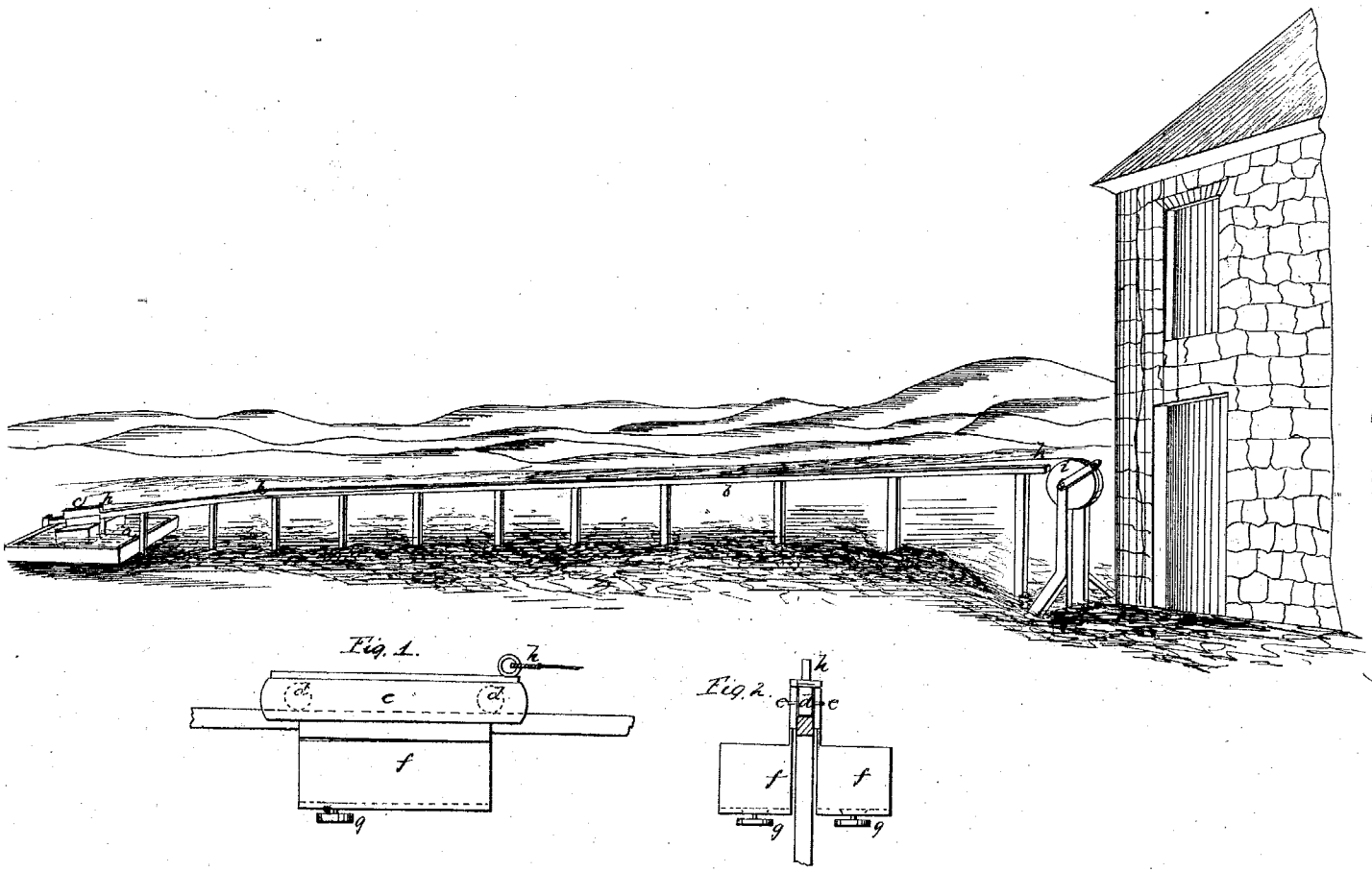
N. PETERS, PHOTO-LITHOGRAPHER, WASHINGTON, D. C.

7237x William Bryant, Davidson, Tennessee

Letters Patent.

The Schedule referred to in these Letters Patent and making part of the same, containing a description in the words of the said William Bryant himself of his improvement in the mode of supplying houses with water.

To all whom these presents shall come.

Be it known that I William Bryant, of the County of Davidson and State of Tennessee have invented new & useful improvements in supplying a house or houses with water; and that the following is a full and exact description of my said improvements. — My improvement, consists in the application of a railway & carriage, to the purpose of conveying water from a spring, or other reservoir, to a house, or houses, without the assistance of any person either to supply the vessel in which the water is conveyed, or to pass ~~or to pass~~ with the carriage, The following described plan for the application of the principle of my invention, answers well where the descent is in sufficient to cause the carriage to pass down the railway to the water by its own gravity. At the place from which the water is to be conveyed a suitable reservoir, is kept sufficiently filled with water. A single rail railway, of the kind that permits the carriage body to hang directly under the rail passes from the place to which the water is to be conveyed to the reservoir; a wheel or drum about one foot in diameter, with an axle thro' its center & a crank & handle to turn it, is placed on suitable supports at the end of the railway next the house. The railway at the reservoir passes directly over the water, and so near to it, & with such descents, that the body of the carriage or water vessel will sink sink into the water so as to fill. The carriage consists of two
small wheels enclosed in a narrow frame, placed one before
the other & about eighteen inches apart from center to center,
and are kept on the rail by guides or flanges; the vessel in
which the water is conveyed is the only body of the carriage,
it may be of sheet iron or any other suitable material; & is
suspended from the wheel frame in such a manner as to
hang directly under the rail. The water vessel has a valve
in the bottom, which rises when it sinks in the water,
and permits it to fill, & shuts as it is drawn out & retains
the water in the vessel. A cord as long as the railway
is attached at one end of the carriag, & the other end to the
x drum. (The operation is as follows. The drum is let at liberty
to turn, and the carriage passes to the reservoir and fills,
it is then drawn back by the rope winding around the
drum as it is turned. Where the inclination is not
sufficient for the carriage to pass to the water by its
own gravity, a cord twice as long as the railway
is used; and passes around a fixed pulley at the reservoir
and also the drum; & the carriage is drawn backwards
& forwards by turning the crank. In applying the principle
of my invention as before named, I do not confine myself
to the use of any one particular plan of the carriage, or
method of supplying it with water, or to one particular
kind of railway; different kinds of carriages & rail-
ways, & different methods of supplying the carriage
x may be used for the same purpose,) nor do I claim as
my invention the conveyance of water on a railway
by engines either locomotive or stationary; I only claim
as my invention or discovery the principle of supply-
ing a house or houses with water by means of rail-
ways and carriages and the application of a rail-
way and carriage to that purpose, whilst the same con 7237x Oct 25, 1832 conveying the water remains at the house to which it is conveyed.

Witnesses William Bryant

Duncan Robertson
John H. Robertson 704 acs